(12) United States Patent
Hsu

(10) Patent No.: US 6,249,368 B1
(45) Date of Patent: Jun. 19, 2001

(54) LIGHT SOURCE MODULE FOR OPTICAL SCANNER

(75) Inventor: Ting-Chia Hsu, ChiaLi (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 09/481,409

(22) Filed: Jan. 12, 2000

(51) Int. Cl.⁷ .................................................. G02B 26/08
(52) U.S. Cl. ........................ 359/212; 358/475; 358/497; 362/217
(58) Field of Search ................................ 359/196, 212, 359/868, 869; 355/18, 67; 399/219, 220, 221; 362/97, 98, 217; 358/474, 475, 483, 494, 497

(56) References Cited

U.S. PATENT DOCUMENTS 3,981,575 * 9/1976 Tanaka et al. .......................... 355/1
4,473,865 * 9/1984 Landa ...................................... 362/6

* cited by examiner

Primary Examiner—James Phan
(74) Attorney, Agent, or Firm—Dougherty & Troxell

(57) ABSTRACT

A light source module for scanner includes a lamp socket, a lamp tube and a light shade. The lamp socket has an elongate opening pointing toward the document board of the scanner and a parabola trough with internal surface coating with reflective material. The lamp tube is located at the focal point of the parabola trough. The light shade is a curved member located adjacent the opening to partly block the opening and is taper off at two ends. Light rays become parallel after reflecting from the parabola surface and may project to the document board through the opening with strong intensity with less random light for obtaining improved scanning quality. The light shade block more light at the middle portion of the opening than two ends so that more evenly distributed light may be emitted out through the opening to further improve scanning quality.

23 Claims, 10 Drawing Sheets

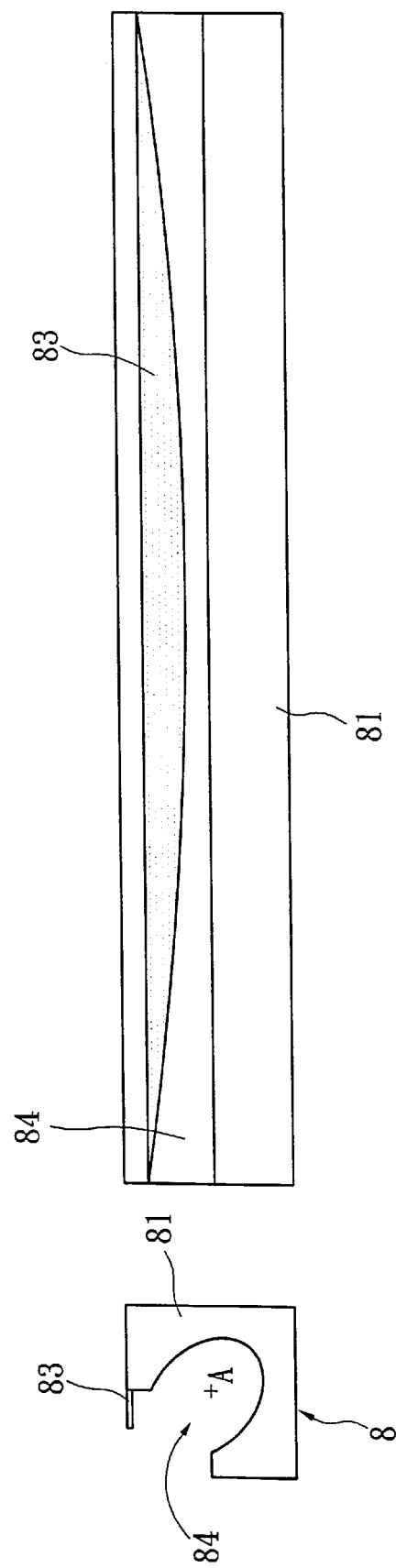

LIGHT SOURCE MODULE FOR OPTICAL SCANNER

FIELD OF THE INVENTION

This invention relates to a light source module for optical scanner and particuarly to a light source module that is able to provide even luminosity for enhancing scanning quality.

BACKGROUND OF THE INVENTION

Optical scanner is widely used computer peripheral device which uses a light source module to provide light source to scan a document and uses a chassis to reflect document image to a charged couple device for converting the image to digital signals for computer process.

FIG. 1 illustrates a conventional scanner 1 which includes a document, board 2, a chassis 3, a transmission means 4 and a charged couple device (CCD) 5

The document board 2 is a rectangular and transparent member for holding a scanning document 6 thereon. The chassis 3 is located below the document board 2 and includes a plurality of reflection mirrors 31, a lens 32 and a light source module 7 for emitting light ray to the document 6. Image on the document 6 then is reflected to the reflection mirrors 31 and lens 32 which forms an image on the CCD 5 for converting to digital signals. The transmission means 4 drives the chassis 3 and CCD 5 moving reciprocally below the document board 2 to perform scanning operation.

FIG. 2 shows the light source module 7 used in the conventional scanner. It is engaged with the chassis 3 and moved synchronously with the chassis 3. The light source module 7 includes a lamp socket 71 and a lamp tube 72. The lamp socket 71 is a trough member having a length approximately same as the chassis 3 with an elongate opening 73 pointing toward the document board 2. The lamp tube 71 is nested in the trough and being held at two ends (not shown in the figure). The trough has circular crosssection and has a reflective sheet 74 or material covering the internal surface. Light ray from the lamp tube 72 may emit directly to the document board 2 through the opening 73 and may also reflect from the reflective sheet 74 and project to the document board 2 to augment light luminosity on the document board 2.

FIG. 3A illustrates relationship between luminosity and distance of the lamp tube 72. The lamp tube 72 may be considered as aggregation of many individual light spots. The middle portion of the lamp tube 72 has overlap light ray from the adjacent light spots and may result in greater luminosity. The two ends of the lamp tube 72 has less overlap light ray and will result in less luminosity. As a result, the photo electricity conversion in the CCD also will be affected. As shown in FIG. 3B, the middle portion of the CCD receives grater light intensity and will result in higher voltage while the two ends of the CCD will receive less light intensity and result in lower voltage. This phenomenon has greater impact on scanning quality. In order to remedy such problem, conventional approach is to coat or adhere a non-reflective material 75 on the reflective sheet 74. The non-reflective material 75 is taper off at two ends so that the two ends will have greater reflective surface to compensate the smaller light emitting intensity of the lamp tube at two ends to get an evenly distributed luminosity and voltage (as shown in FIGS. 4C and 4D). The non-reflective material 75 may be one piece (as shown in FIG. 4A) or two pieces (as shown in FIG. 4B).

However the conventional technique set forth above still has drawbacks, notably:

a. the trough for nesting the lamp tube is generally a circle or square in crosssection. It prones to produce random or mixed light emission and may result in poorer scanning quality.

b. The non-reflective material is either printed or glued on the reflective sheet. The printing method will create environmental pollution problem. The gluing method is a tedious process and costs higher.

All of these concerns have yet to be resolved.

SUMMARY OF THE INVENTION

It is an object of this invention to provide a light source module for scanner that has an improved light gathering effect to reduce random light emission for achieving better scanning quality.

It is another object of this invention to provide a light source module that has a light shade integrally formed with the lamp socket for reducing cost and improving production efficiency.

The light source module according to this invention includes a lamp socket, a lamp tube and a light shade. The lamp socket has a parabola trough and an elongate opening pointing toward the document board. The lamp tube is held at the focal point of the parabola trough which may produce parallel reflection light rays and emitting through the opening to the document board. The random light effect thus may be reduced for getting improved scanning quality. The light shade is a curved shape member taper off at two ends to partly block the opening so that evenly distributed light emission may be obtained through the opening for achieving improved scanning quality.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENTS

Figure 1:
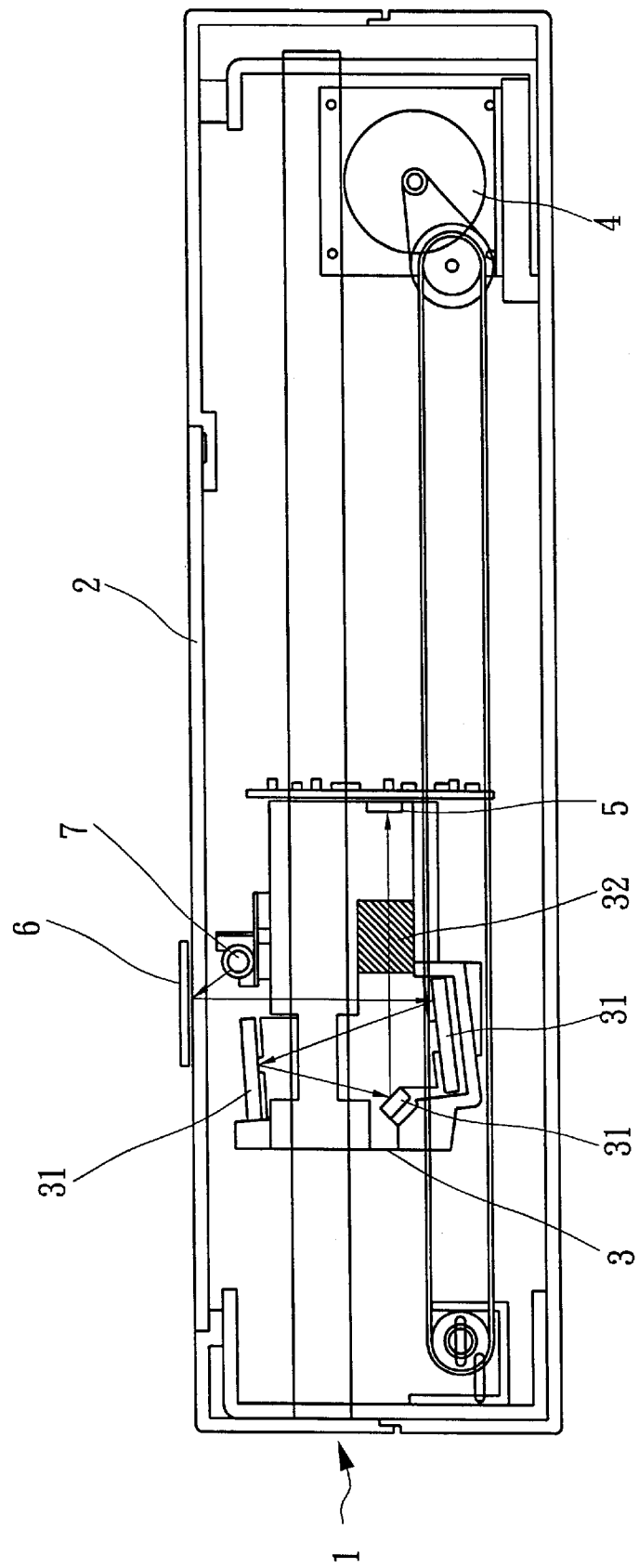
FIG. 1 is a schematic view of a conventional scanner.
Figure 2:
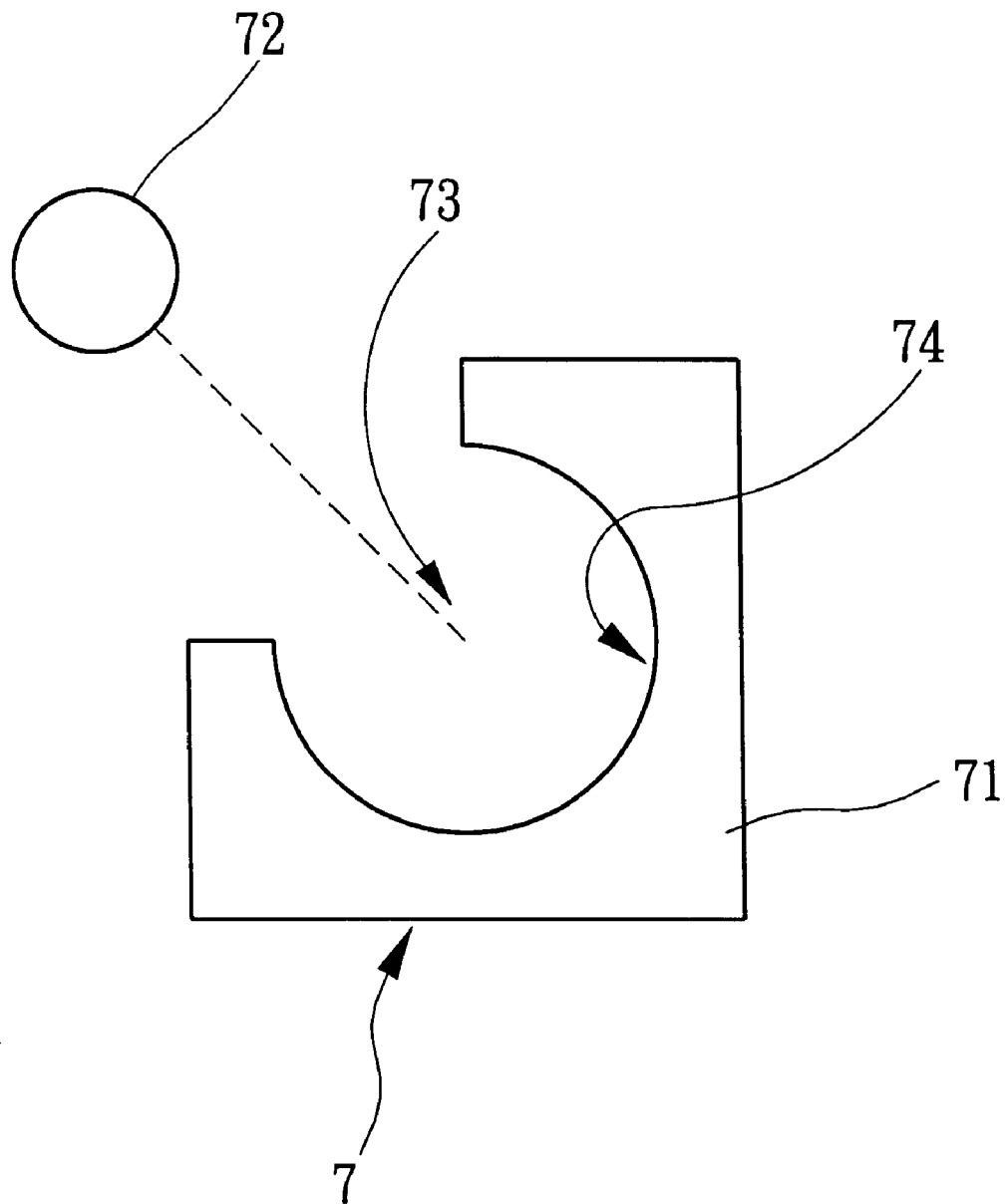
FIG. 2 is a side view of a conventional light source module for a scanner.
Figure 3:
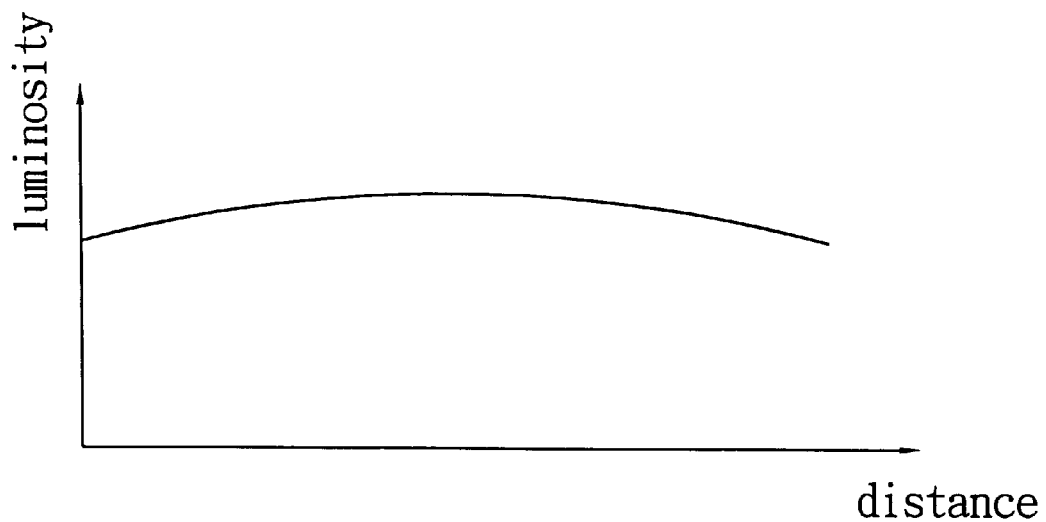
FIG. 3A is a chart showing luminosity-distance relationship of a conventional light source module.
FIG. 3B is a chart showing voltage-distance relationship generated in a CCD resulting from a conventional light source module.
Figure 3:
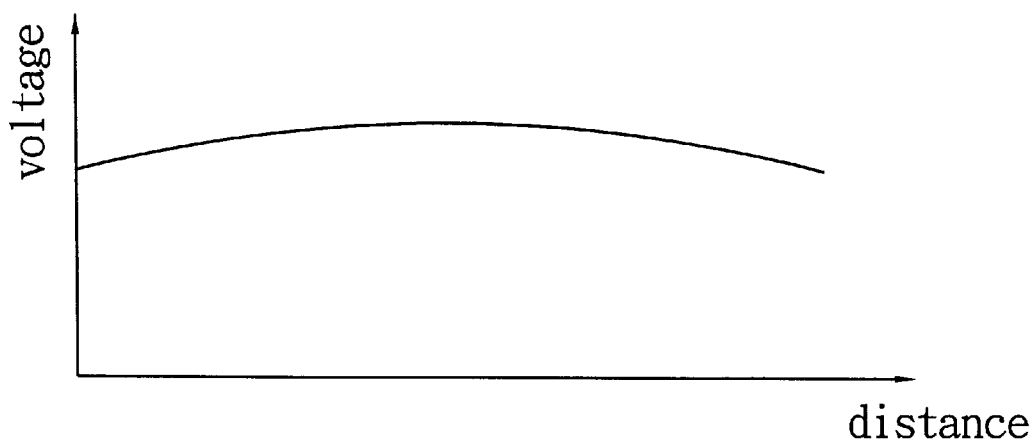
Figures 4A, 4E:
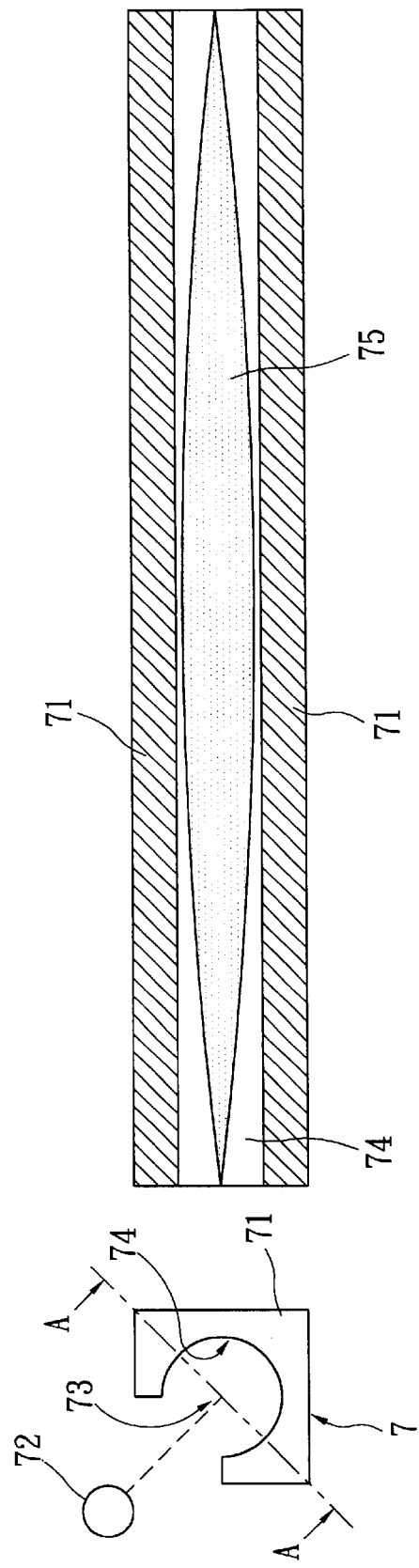
FIGS. 4A and 4B are schematic views of conventional method of gluing non-reflective material in the light source module.
FIG. 4E is an end view of the structure illustrated in FIG. 4A.
Figure 4:
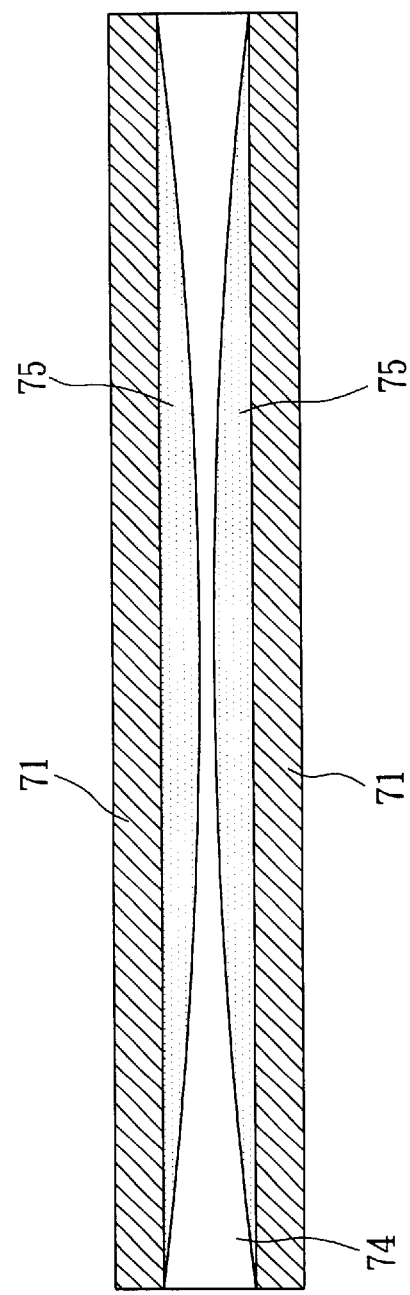
FIG. 4C is a chart showing luminosity-distance relationship produced by a light source module resulting from remedy measures made in FIG. 4A or 4B.
FIG. 4D is a chart showing voltage-distance relationship produced by a CCD resulting from remedy measures made in FIG. 4A or 4B.
FIG. 4F is an end view of the structure illustrated in FIG. 4B.
Figure 4:
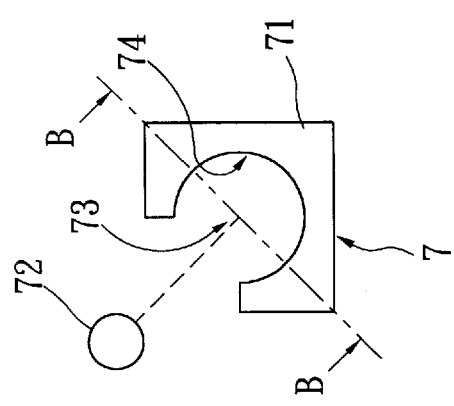
Figure 4:
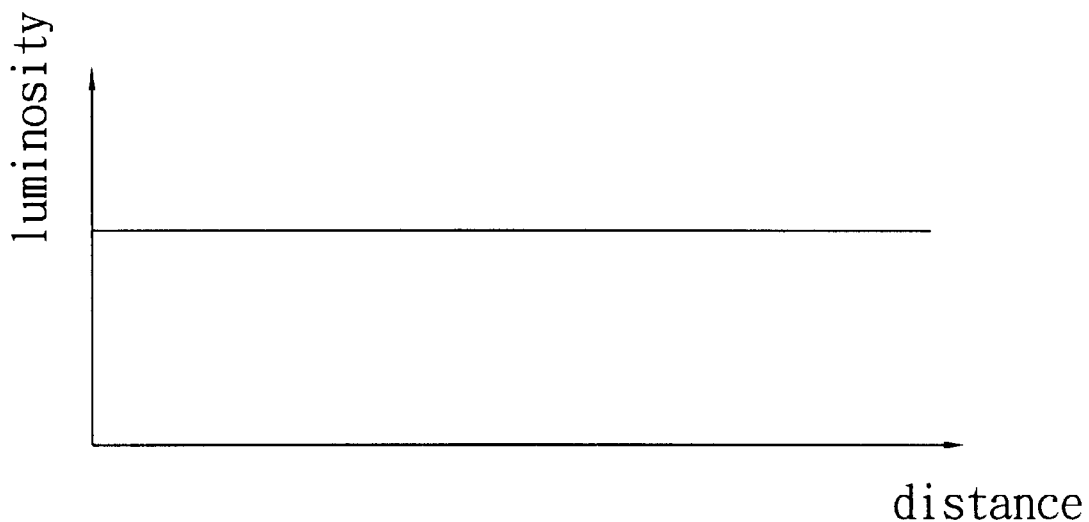
Figure 4:
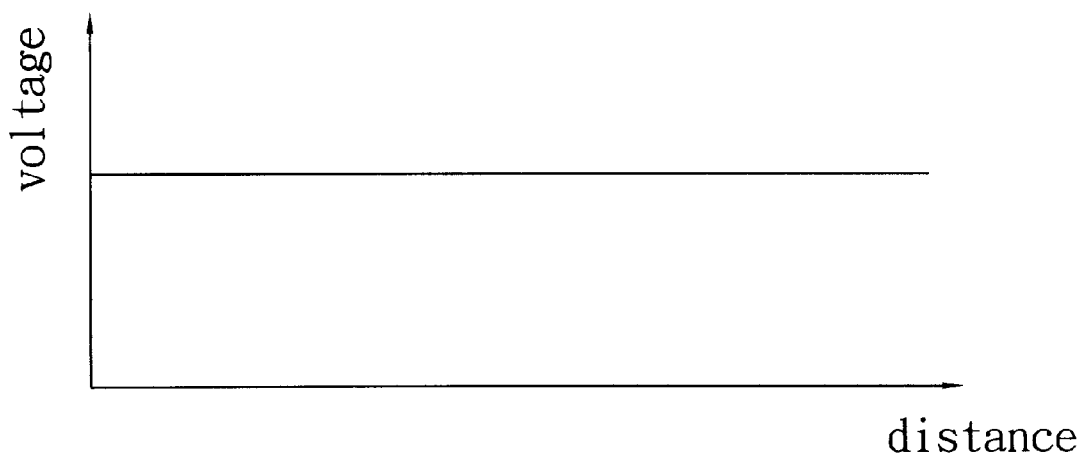

The light source module of this invention is mounted on a chassis located below a document board of a scanner (as shown in FIG. 1). The light source module emits light ray toward the document board. Document image is reflected to a CCD for converting to digital signals for computer process.

Figure 5:
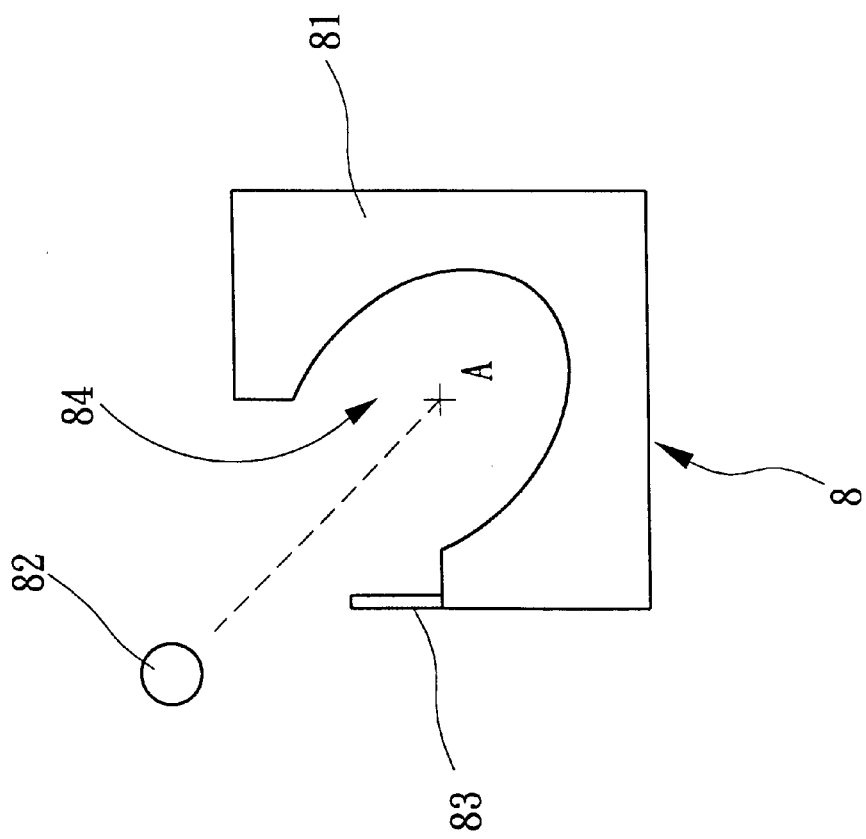
FIG. 5 is a schematic side view of this invention.

Referring to FIG. 5, the light source module 8 of this invention includes a lamp socket 81 which has a parabola trough inside and an elongate opening 84. A lamp tube 82 held at two ends by two lamp fixtures (not shown in the figure) at the focal point A of the parabola trough, and a light shade 83 attached to one side of the lamp socket 81 to partly block the opening 84.

Figure 6:
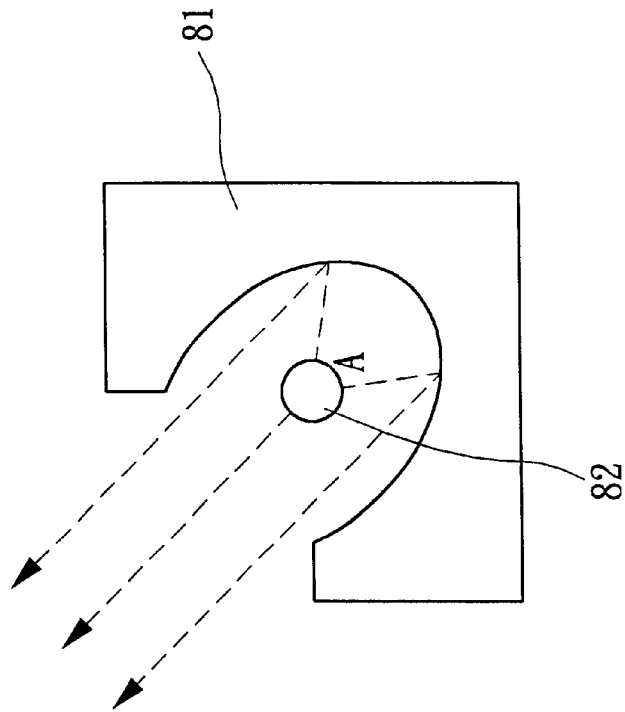
FIG. 6 is a schematic side view of this invention in use.

Referring to FIG. 6, the internal surface of the trough is electroplated or glued with a reflective layer. Part of light rays from the lamp tube 82 emits directly through the opening 84 toward the document board (not shown in the figure). Those light rays not directly emitting through the opening 84 are reflected on the parabola surface of the trough and become parallel after reflection because of the parabola surface nature. The parallel light rays then emitting through the opening 84 toward the document board. The document held on the document board thus may receive strong and parallel light projection to get an improved scanning quality. Random light emission and projection may be greatly reduced.

Figures 7A, 7B:
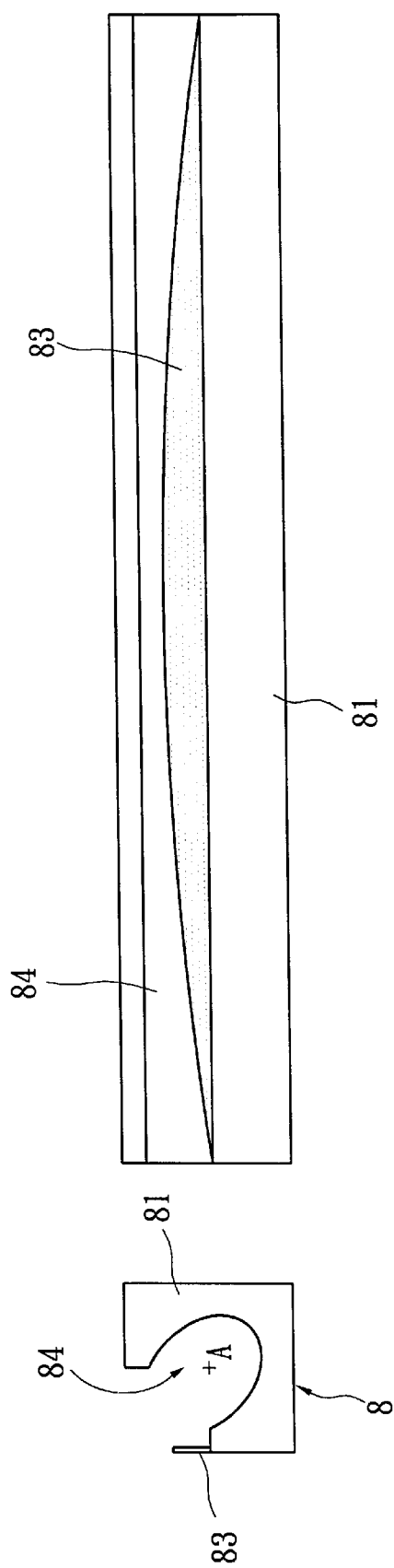
FIGS. 7A–7F are embodiment variation views of this invention.
Figure 7:
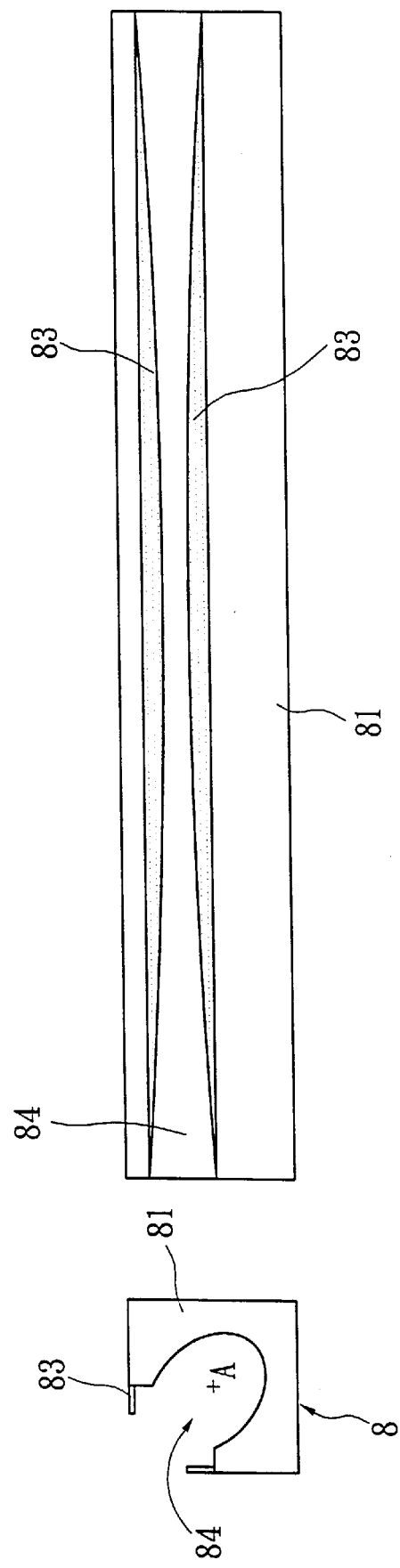

Referring to FIGS. 7A and 7B, the light shade 83 is a curved member with two taper ends to partly block the opening 84 from a front side of the socket 8. The middle portion of the opening 84 which receives stronger light emission has less opening area while the two ends which receive weaker emission have larger opening area. Hence total emission after light rays pass through the opening 84 will be evenly compensated and distributed to get an even projection on the document board to obtain an improved scanning quality.

FIGS. 7C and 7D show another embodiment variation with the light shade 83 located at the top side of the socket 81.

FIGS. 7E and 7F show a further embodiment variation that has two light shades 83 located at the front and top sides of the socket 81.

The light shade 83 is preferably a non-transparent material and may be integrally made with the socket 81. It is low cost and easy to produce at higher production efficiency.

It may thus be seen that the objects of the present invention set forth herein, as well as those made apparent from the foregoing description, are efficiently attained. While the preferred embodiments of the invention have been set forth for purpose of disclosure, modifications of the disclosed embodiment of the invention as well as other embodiment thereof may occur to those skilled in the art. Accordingly, the appended claims are intended to cover all embodiments which do not depart from the spirit and scope of the invention.

What is claimed is:

1. A light source module for optical scanner which has a document board for holding a document to receive light from the light source module, comprising:
    a lamp socket having a trough with internal surface coated with a reflective material and an elongate opening pointing toward the document board;
    a lamp tube located in the lamp socket, wherein the trough is parabola and has a focal point where the lamp tube is held.

2. The light source module of claim 1 further having a curved light shade located at and partly block the opening, the blocking portion being taper off at two ends of the opening.

3. The light source module of claim 1, wherein the lamp socket has fixtures at two ends for holding the lamp tube at the focal point.

4. The light source module of claim 1, wherein the reflective material is a reflective metal.

5. The light source module of claim 1, wherein the reflective material is made by electroplating.

6. The light source module of claim 1, wherein the reflective material is glued to the lamp socket.

7. The light source module of claim 2, wherein the light shade is integrally made with the lamp socket.

8. The light source module of claim 2, wherein the light shade is located at a lower portion of the opening.

9. The light source module of claim 2, wherein the light shade is located at an upper portion of the opening.

10. The light source module of claim 2, wherein two light shades are provided and located respectively at an upper and lower portion of the opening.

11. The light source module of claim 1 further having a chassis, a charged couple device and a transmission means, the chassis receiving document image, the charged couple device capturing the image, the transmission means driving the chassis and charged couple device for scanning operation.

12. The light source module of claim 11, wherein the light source module is mounted on the chassis.

13. A light source module for optical scanner which has a document board for holding a document to receive light from the light source module, comprising:
    a lamp socket having an elongated opening pointing toward the document board and a parabola trough which has internal surface coating with a reflective material for reflecting light;
    a lamp tube located at a focal point of the parabola trough, and
    at least one light shade formed in a curved shape located adjacent the opening to partly block the opening, the blocking of the opening is taper off at two ends of the opening.

14. The light source module of claim 13, wherein the lamp socket has fixtures at two ends for holding the lamp tube at the focal point.

15. The light source module of claim 13, wherein the reflective material is a reflective metal.

16. The light source module of claim 13, wherein the reflective material is made by electroplating.

17. The light source module of claim 13, wherein the reflective material is glued to the lamp socket.

18. The light source module of claim 13, wherein the light shade is integrally made with the lamp socket.

19. The light source module of claim 13, wherein the light shade is located at a lower portion of the opening.

20. The light source module of claim 13, wherein the light shade is located at an upper portion of the opening.

21. The light source module of claim 13, wherein two light shades are provided and located respectively at an upper and lower portion of the opening.

22. The light source module of claim 13 further having a chassis, a charged couple device and a transmission means, the chassis receiving document image, the charged couple device capturing the image, the transmission means driving the chassis and charged couple device for scanning operation.

23. The light source module of claim 22, wherein the light source module is mounted on the chassis.

* * * * *